United States Patent

Abramzon et al.

[11] Patent Number: 5,915,469
[45] Date of Patent: Jun. 29, 1999

[54] CONDENSER HEAT EXCHANGER

[75] Inventors: Boris Abramzon, Beer Sheba; Jacob Danan, Ramat Aviv; Shlomo Ostersetzer, Ramat Hen, all of Israel

[73] Assignee: Tat Aero Equipment Industries Ltd., Gedera, Israel

[21] Appl. No.: 08/901,441

[22] Filed: Jul. 28, 1997

Related U.S. Application Data

[63] Continuation of application No. 08/575,015, Dec. 19, 1995, abandoned.

[30] Foreign Application Priority Data

Jul. 16, 1995 [IL] Israel ........................................ 114613

[51] Int. Cl.$^6$ .................................................... F28F 19/00
[52] U.S. Cl. ...................... 165/134.1; 165/135; 165/146; 165/166
[58] Field of Search .................................... 165/166, 146, 165/135, 134.1

[56] References Cited

U.S. PATENT DOCUMENTS

| | | | |
|---|---|---|---|
| 1,740,145 | 12/1929 | Bates | 165/166 X |
| 3,148,442 | 9/1964 | Gier, Jr. | 165/166 |
| 3,613,782 | 10/1971 | Mason et al. | 165/146 X |
| 3,860,065 | 1/1975 | Schauls | 165/166 |
| 4,041,591 | 8/1977 | Noll et al. | 165/166 X |
| 4,049,051 | 9/1977 | Parker | 165/146 X |
| 4,116,271 | 9/1978 | DeLepeleire | 165/166 |
| 4,198,830 | 4/1980 | Campbell | 62/87 |
| 4,246,963 | 1/1981 | Anderson | 165/166 |
| 4,352,273 | 10/1982 | Kinsell, et al. | 165/166 |
| 4,862,952 | 9/1989 | Tarasewich et al. | 165/166 X |
| 4,934,455 | 6/1990 | Hasegawa | 165/166 |
| 4,971,137 | 11/1990 | Thompson | 165/166 X |
| 5,025,642 | 6/1991 | Brunskill et al. | 165/166 |
| 5,035,284 | 7/1991 | Oya et al. | 165/166 X |
| 5,036,907 | 8/1991 | Levén | 165/166 X |
| 5,121,792 | 6/1992 | Schukey | 165/166 |
| 5,333,683 | 8/1994 | Arriulou et al. | 165/166 |
| 5,465,785 | 11/1995 | Adderley et al. | 165/166 |
| 5,538,700 | 7/1996 | Koves | 165/166 X |

FOREIGN PATENT DOCUMENTS 154851  11/1938  Germany ................................ 165/146

OTHER PUBLICATIONS

Eckert, E.R.G., et al., *Analysis of Heat and Mass Transfer*, McGraw–Hill, Inc., 1972, pp. 78–95.

*Primary Examiner*—Ira S. Lazarus
*Assistant Examiner*—Christopher Atkinson
*Attorney, Agent, or Firm*—Abelman, Frayne & Schwab

[57] ABSTRACT

A heat exchanger including a plurality of heat transfer elements defining hot and cold fluid flow paths with inlet and outlet ends for flow therethrough of a relatively hot fluid and a relatively cold fluid respectively, the hot and the cold fluid flow paths each having at least one portion substantially parallel to each other in which the relatively hot fluid and the relatively cold fluid flow in a common direction such that a thermal resistance between the plurality of heat transfer elements and the flow of the fluids therethrough, and a temperature difference between the hot and the cold fluid flow paths, are maintained over a portion of the heat exchanger to substantially prevent freezing of at least one component of either of the relatively hot fluid and the relatively cold fluid.

6 Claims, 5 Drawing Sheets

CONDENSER HEAT EXCHANGER

This application is a Continuation application under 37 C.F.R. 1.62 of prior application Ser. No. 08/575,015, filed on Dec. 19, 1995, now abandoned.

FIELD OF THE INVENTION

The present invention relates to apparatus and methods for fluid conditioning generally and more particularly to apparatus and methods for prevention of excessive ice formation at the cold fluid inlet of heat exchangers used in such apparatus and methods.

BACKGROUND OF THE INVENTION

Fluid conditioning systems are known in the art for providing fluid in a certain desired range of temperature, pressure and humidity. Such systems are particularly useful in providing conditioned air in aircraft.

Fluid conditioning systems are known in the art in which water is condensed from the working fluid, such as air, while at high pressure. U.S. Pat. No. 4,198,830 of Campbell discloses such a system with the addition of a reheater heat exchanger. In the Campbell patent, moist air is introduced into the reheater heat exchanger at relatively high pressure and warm temperature, and is cooled therethrough below the dew point. The air then flows through a first set of finned passageways of a condenser heat exchanger. The pressure does not change significantly, but a relatively large amount of water is condensed from the air and drained by a water separator, such as a water trap.

The air is then caused to reflow through the reheater exchanger where it is reheated and passed to an expansion turine. The purpose of reheating the air is two-fold: to re-evaporate any residual moisture in the air before entering the turbine, and to increase the total turbine and cycle efficiency by increasing the temperature of the air at the turbine entrance, thereby increasing the enthalpy for enhanced power extraction by the turbine. The air thus enters the turbine at relatively high pressure and warm temperature, with entrained water vapor but with virtually no entrained liquid water. During expansion in the turbine, a major portion of the remaining water vapor condenses.

After expanding in the turbine, the air is caused to flow through a second set of finned passageways in the condenser heat exchanger. This second set of passageways is substantially perpendicular to the first set. The condenser heat exchanger is a cross-flow type of exchanger well known in the art. Air exits the turbine and enters the condenser at low temperature and low pressure, with entrained liquid water. This cold air is used in the condenser heat exchanger to absorb heat from the air flow in the abovementioned first set of finned passageways, causing a large portion of the entrained water vapor to condense. Air exits the second set of finned passageways to a user, such as a cockpit of an aircraft.

The temperature of the condenser heat exchanger metal, at least near the cold side inlet facing the exit of the turbine, nay be below zero degrees Celsius under some extreme conditions. A problem of the above described installation is that at these extreme conditions, ice particles or snow present in the cold air exiting the turbine may strike and adhere to the cold inlet side if the condenser heat exchanger. As a result, ice and snow may build up on the cold inlet face. In addition, the entrained moisture in the hot air flowing through the condenser in the proximity of the cold inlet face may freeze on the surface of the finned passageways. Thus, ice deposition may block air flowing through both the cold and hot sides of the condenser heat exchanger.

U.S. Pat. No. 4,246,963 of Anderson addresses the problem of ice formation by passing hot fluid through hollow closure bars on the condenser heat exchanger near the inlets to the passageways of the cold air coming from the turbine.

U.S. Pat. No. 4,352,273 of Kinsell et al uses the heated closure bar idea of Anderson, and also uses a bypass in the middle of the condenser heat exchanger to ensure that an adequate supply of conditioned air is supplied to the user despite any ice formation.

A problem of the Anderson and Kinsell patents is that the closure bars add to the cost and complexity of the fluid conditioning system. Moreover, changes in turbine discharge velocities can cause flow and temperature stratification in the cold side inlet of the condenser heat exchanger. U.S. Pat. No. 5,025,642 of Brunskill et al tries to solve the stratification problem by using a back pressure plate to minimize flow velocity stratification and a bypass to produce a relatively predictable bypass flow ratio regardless of flow velocity stratification. Of course, the first problem of cost and complexity is not addressed but rather aggravated.

Another problem is that the referenced prior art tries to defeat ice formation only at the cold side inlet of the condenser heat exchanger. However, ice may form at other portions of the condenser, including the passageways for flow of air from the reheater heat exchanger. Heating closure bars at the cold side inlet and bypass devices only help deice flow from the turbine through the condenser heat exchanger, but have little to do with deicing the reheater flow.

Furthermore, ice formation causes partial blockage of finned passageways and causes a larger portion of the air to flow through the bypass. More air flowing through the bypass means that less water is condensed and then separated by the water separator, so that more water is added to the air flow reaching the turbine, ultimately increasing ice formation at the condenser heat exchanger inlet. This phenomenon has been confirmed during system tests of equipment built in accordance with the prior art, in which large amounts of ice formed in the condenser heat exchanger. In extreme conditions, almost all of the finned passageways were blocked.

SUMMARY OF THE INVENTION

The present invention seeks to provide improved, simplified and efficient apparatus and methods for preventing ice formation in a condenser heat exchanger, and which overcome the aforementioned problems of the prior art.

The present invention substantially prevents ice formation by using a parallel flow condenser heat exchanger instead of the cross-flow type used in the prior art, and by ensuring that the temperature of the metallic surfaces of the fins and parting plates of the condenser heat exchanger are maintained above the freezing point, e.g. zero degrees Celsius for water at atmospheric pressure.

As is known in the art, a parallel flow heat exchanger is less thermally efficient than cross-flow or counter-flow heat exchangers. However, in a condenser heat exchanger operating with sub-freezing fluid flow, the efficiency must be kept relatively low because the quantity of heat to be transferred must be strictly limited anyway to prevent freezing of the condensate. The use of a parallel flow heat exchanger helps to provide the necessary limitation of excessive heat transfer, while ensuring adequate condensation.

It is somewhat difficult to separate the hot and cold fluids at the inlet and exit of a parallel flow heat exchanger, as is known in the art. In the present invention, the inlet and exit ends of the hot fluid are constructed such that there is a cross-flow of hot fluid with respect to the cold fluid. Unlike the prior art, the inlet cross-flow portion of the cold fluid flow is not constructed for heat transfer purposes. On the contrary, the fin density of the cold fluid finned passageways in the inlet cross-flow portion is relatively low such that heat transfer between the cold fluid and the cold inlet heat exchanger surfaces is minimized in order to ensure that the temperature of the cold side surfaces does not drop below freezing. Indeed no fins are required in the cold inlet cross-flow portion for heat transfer; rather fins are present for structural integrity and for smoothing and equalizing the flow of fluid.

In the hot fluid flow path, the inlet cross-flow portion directs the hot fluid towards the parallel flow portion. Fins are provided in the passageways of the hot inlet cross-flow portion to maintain the temperature of the metallic surfaces above the freezing point.

The fin densities in the hot and cold parallel flow portions are relatively high for good heat transfer in a relatively compact volume. The bulk of the heat transfer in the condenser heat exchanger occurs in the parallel flow portion. Ice formation is prevented by designing the finned passageways such that the thermal resistance to heat transfer from the hot side is lower than the thermal resistance to heat transfer from the cold side of the heat exchanger.

Specifically, the fin geometry (e.g. height, density, thickness) is designed to satisfy the following condition:

$$R_c / R_h > (-T_c / T_h)$$

$$\text{where } R_h = 1/(h_h A_h e_h) \text{ and}$$

$$R_c = 1/(h_c A_c e_c)$$

are the thermal resistances between the flow and the heat transfer surface from the hot side and the cold side of the condenser heat exchanger, respectively, and where h=heat transfer coefficient (W/m$^2$C)
A=heat transfer area (m$^2$)
e=heat transfer surface efficiency
T=local flow temperature (C)

The subscripts h and c denote the hot and cold flow sides respectively. The equation holds for the parallel flow portion and the cross-flow inlet and exit portions.

The heat transfer surface efficiency may be calculated for finned heat transfer surfaces as described in "Analysis of Heat and Mass Transfer", by Eckert and Drake, McGraw-Hill, Inc., 1972.

The cross-flow exit portion serves to separate the hot and cold flows at the condenser heat exchanger outlet. The exit portion provides only a minor contribution to the total amount of heat transferred. The exit portion may be constructed with the same fin densities as the inlet portion.

The anti-icing performance of the present invention may be further enhanced by spacing the fins of the hot fluid flow path closer together in the exit portion than in the inlet portion. This directs more flow of hot fluid to the vicinity of the cold inlet of the condenser where the danger of ice formation is the greatest.

Thus the present invention substantially prevents ice formation in the entire condenser heat exchanger for both paths of flow from the turbine and the reheater heat exchanger.

In addition, the present invention includes streamlined closure bars. The closure bars have a tapered cross portion at the cold flow face of the condenser heat exchanger facing the turbine. The streamlined shape tends to minimize the flow stagnation zones on the front of the closure bars and to reduce the effect of inertial capture of snow and ice particles by the closure bars.

For the sake of clarity and to emphasize the ability of the present invention to overcome the aforementioned problems of the prior art, the present invention is described in the detailed description with reference to a fluid conditioning system having a turbine and a reheater heat exchanger. However, it will be appreciated by persons skilled in the art that the present invention is not limited to such an application.

There is thus provided in accordance with a preferred embodiment of the present invention, a heat exchanger including a plurality of heat transfer elements defining hot and cold fluid flow paths with inlet and outlet ends for flow therethrough of a relatively hot fluid and a relatively cold fluid respectively, the hot and the cold fluid flow paths each having at least one portion substantially parallel to each other in which the relatively hot fluid and the relatively cold fluid flow in a common direction such that a thermal resistance between the plurality of heat transfer elements and the flow of the fluids therethrough, and a temperature difference between the hot and the cold fluid flow paths, are maintained over a portion of the heat exchanger to substantially prevent freezing of at least one component of either of the relatively hot fluid and the relatively cold fluid.

In accordance with a preferred embodiment of the present invention, the plurality of heat transfer elements is arranged in a stack of a plurality of alternating rows of the hot fluid flow path and the cold fluid flow path.

Additionally in accordance with a preferred embodiment of the present invention, a closure bar separates each of the alternating rows at the inlet end of the relatively cold fluid. Preferably the closure bar has a streamlined shape.

Additionally in accordance with a preferred embodiment of the present invention, the plurality of heat transfer elements includes a plurality of finned passageways.

Further in accordance with a preferred embodiment of the present invention, the finned passageways of the hot fluid flow path have a fin density greater near the outlet end than near the inlet end.

There is also provided in accordance with a preferred embodiment of the present invention, a condenser heat exchanger, a portion thereof including generally parallel flows in a common direction of a relatively hot fluid and a relatively cold fluid.

There is also provided in accordance with a preferred embodiment of the present invention, a fluid conditioning system including a heat exchanger, wherein a portion of the heat exchanger includes generally parallel flows in a common direction of a relatively hot fluid and a relatively cold fluid.

There is also provided in accordance with a preferred embodiment of the present invention, for use in a heat exchanger having a plurality of heat transfer elements and hot and cold fluid flow paths with inlet and outlet ends for flow therethrough of a relatively hot fluid and a relatively cold fluid respectively, a method for substantial prevention of ice formation in a portion of the heat exchanger including arranging the hot and the cold fluid flow paths such that each has at least one portion substantially parallel to each other in which the relatively hot fluid and the relatively cold fluid flow in a common direction such that a thermal resistance between the plurality of heat transfer elements and the flow of the fluids therethrough, and a temperature difference between the hot and the cold fluid flow paths, are maintained over a portion of the heat exchanger to substantially prevent freezing of at least one component of either of the relatively hot fluid and the relatively cold fluid.

There is also provided in accordance with a preferred embodiment of the present invention, for use in a heat exchanger having a plurality of rows of heat transfer elements through which a relatively cold fluid and a relatively hot fluid flow, a method of substantial prevention of ice formation including separating each of the rows by a closure bar, wherein the closure bar has a taper pointed towards the flow of the relatively cold fluid, the taper having a cross portion such that ice is substantially prevented from forming thereon.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
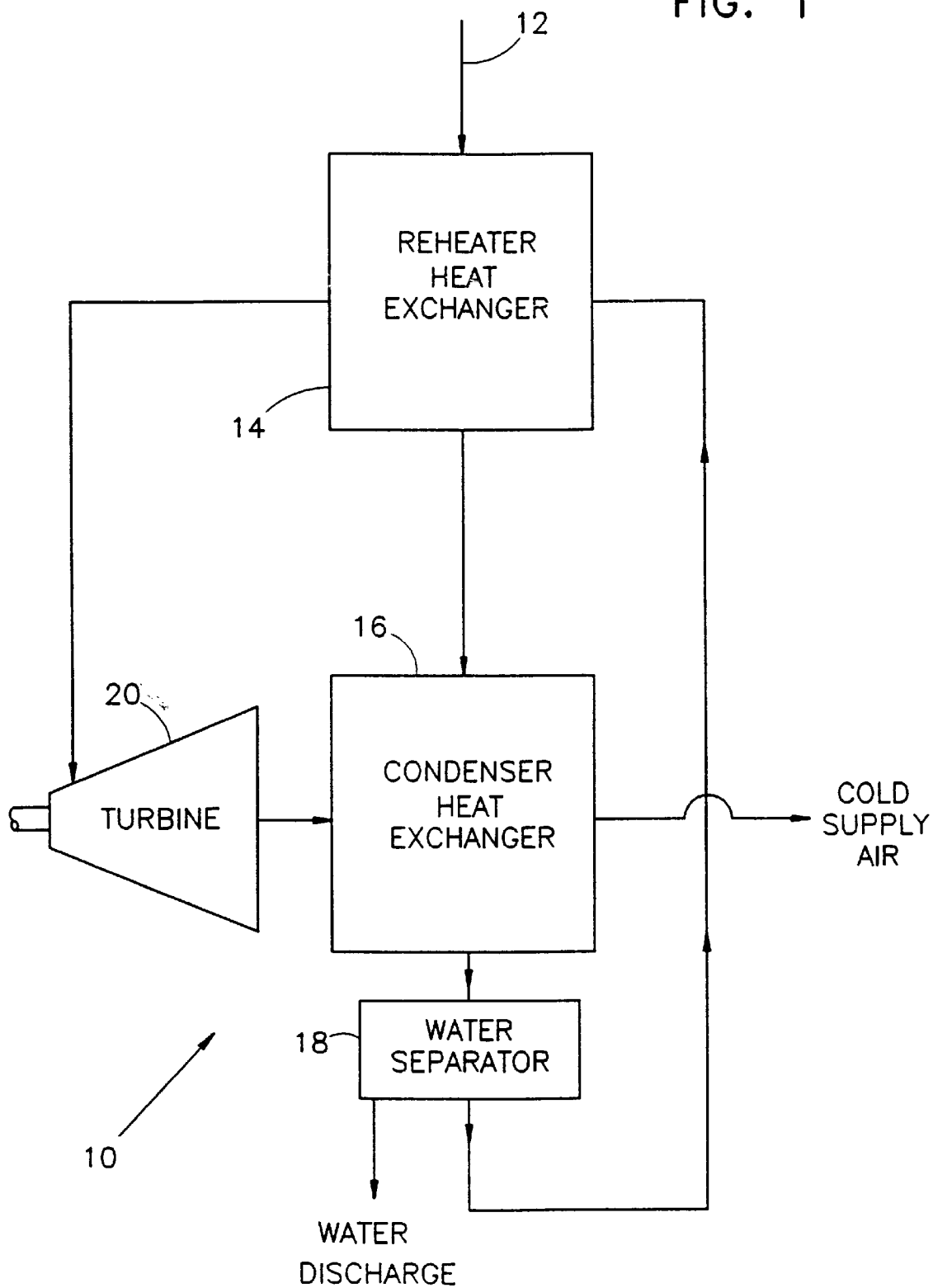
FIG. 1 is a simplified block diagram of a fluid conditioning system constructed and operative in accordance with a preferred embodiment of the present invention.

Reference is now made to FIG. 1 which is a simplified block diagram of a fluid conditioning system 10 constructed and operative in accordance with a preferred embodiment of the present invention.

Fluid conditioning system 10 includes units similar to the system described in U.S. Pat. No. 4,198,830 of Campbell. A fluid 12, such as air, is introduced into a reheater heat exchanger 14 at relatively high pressure, warm temperature and with entrained water vapor. A typical example of fluid 12 at this point is air at an absolute pressure of about 4 atmospheres, about 42 degrees Celsius, with a water content of about 13.5 g/kg vapor and 5.5 g/kg liquid. The fluid reaching the outlet of the reheater is at a lower temperature, with some of the water condensed to liquid. A typical example of fluid 12 at this point is air at an absolute pressure of about 4 atmospheres, about 36 degrees Celsius, with a water content of about 10 g/kg vapor and 9 g/kg liquid.

Fluid 12 then flows through a first set of finned passageways of a condenser heat exchanger 16. The first finned passageways are not shown in the simplified block diagram of FIG. 1, but are described in detail hereinbelow. As distinct from the prior art, and in accordance with a preferred embodiment of the present invention, condenser heat exchanger 16 is a parallel flow type of heat exchanger, the construction of which is described further hereinbelow.

A relatively large amount of water is condensed from fluid 12 in the condenser heat exchanger 16 and drained and discharged by a water separator 18. Typically in the above example, after exiting the condenser heat exchanger 16, fluid 12 is still at the same pressure, has cooled to about 25 degrees Celsius and now has a water content of about 5 g/kg vapor and 15 g/kg liquid.

Fluid 12 is then caused to reflow through the reheater exchanger 14 where it is reheated and passed to an expansion turbine 20. Turbine 20 may operate a compressor or fan. The purpose of reheating fluid 12 is to re-evaporate any residual moisture in fluid 12 and to increase its enthalpy before entering turbine 20. Fluid 12 thus enters turbine 20 at relatively high pressure and warm temperature, with entrained water vapor but with virtually no entrained liquid water. In the above typical example, the absolute pressure at the inlet to turbine 20 may be slightly less than about 4 atmospheres, with a temperature of about 37 degrees Celsius, and now has entrained water vapor of about 6 g/kg and virtually no liquid water.

After expanding in turbine 20, fluid 12 is caused to flow through a second set of finned passageways in the condenser heat exchanger 16. The second finned passageways are not shown in the simplified block diagram of FIG. 1, but are described in detail hereinbelow. In accordance with a preferred embodiment of the present invention, the first and the second set of finned passageways are mutually parallel for at least a portion thereof, as described in detail further hereinbelow.

Fluid 12 exits turbine 20 and enters the condenser heat exchanger 16 at low temperature and low pressure, with entrained liquid water. In the above typical example, the absolute pressure is about one atmosphere, the temperature is about –20 degrees Celsius, and there is entrained liquid water of about 5 g/kg and entrained water vapor of about 1 g/kg. Fluid 12 is used to extract heat from the same fluid flowing through the first set of finned passageways of the condenser, thereby enhancing condensation. Fluid 12 then exits to a user, such as a cockpit of an aircraft.

Figure 2:
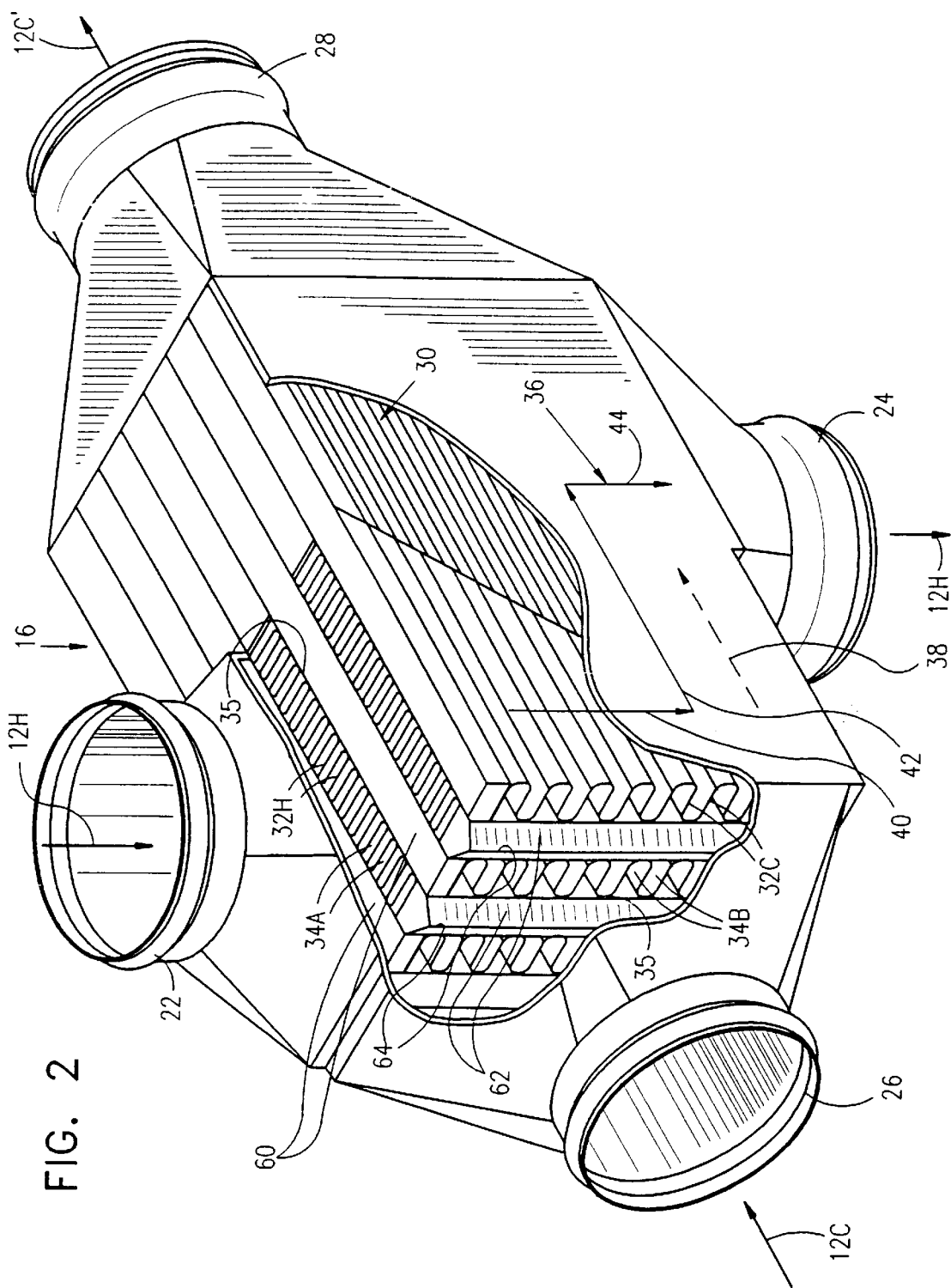
FIG. 2 is a simplified pictorial illustration of a condenser heat exchanger constructed and operative in accordance with a preferred embodiment of the present invention.

Reference is now made to FIG. 2 which is a simplified pictorial illustration of condenser heat exchanger 16. Condenser heat exchanger 16 includes a hot inlet 22 into which flows relatively hot fluid 12, designated 12H, from reheater heat exchanger 14 (not shown in FIG. 2), and a hot outlet 24 in fluid communication with water separator 18 (not shown in FIG. 2). Condenser heat exchanger 16 also includes a cold inlet 26 into which flows relatively cold fluid 12, designated 12C, from turbine 20 (not shown in FIG. 2), and a cold outlet 28 for supplying conditioned fluid, designated 12C', to the user (not shown in FIG. 2). Hot outlet 24 preferably faces in the direction of the force of gravity, downwards in the sense of FIG. 2. The gravitational force helps water to flow towards water separator 18 (not shown in FIG. 2).

Condenser heat exchanger 16 includes a plurality of heat transfer elements which are preferably passageways formed by a plurality of fins 30. Fins 30 may be any conventional fin of the art, such as plate, staggered or lanced offset, for example, and are made of any suitable metal having good thermal conductivity, such as an aluminum alloy.

Fins 30 are arranged in a stack of a plurality of alternating rows 34A and 34B, separated by parting plates 35. The assembled stack is preferably brazed together, as is well known in the art. The fins in rows 34A, designated as fins 32H, define a hot fluid path 36 for fluid flow from reheater heat exchanger 14 and the fins in rows 34B, designated as fins 32C, define a cold fluid path 38 for fluid flow from turbine 20. For the sake of clarity, hot fluid flow path 36 is shown by solid lines and cold fluid flow path 38 is shown by dashed lines.

It is appreciated that fluid 12H flowing in hot fluid flow path 36 is not in fluid communication with fluid 12C flowing in cold fluid flow path 38. However, heat is transferred between fluid 12H flowing in hot fluid flow path 36 and fluid 12C flowing in cold fluid flow path 38.

Figure 3:
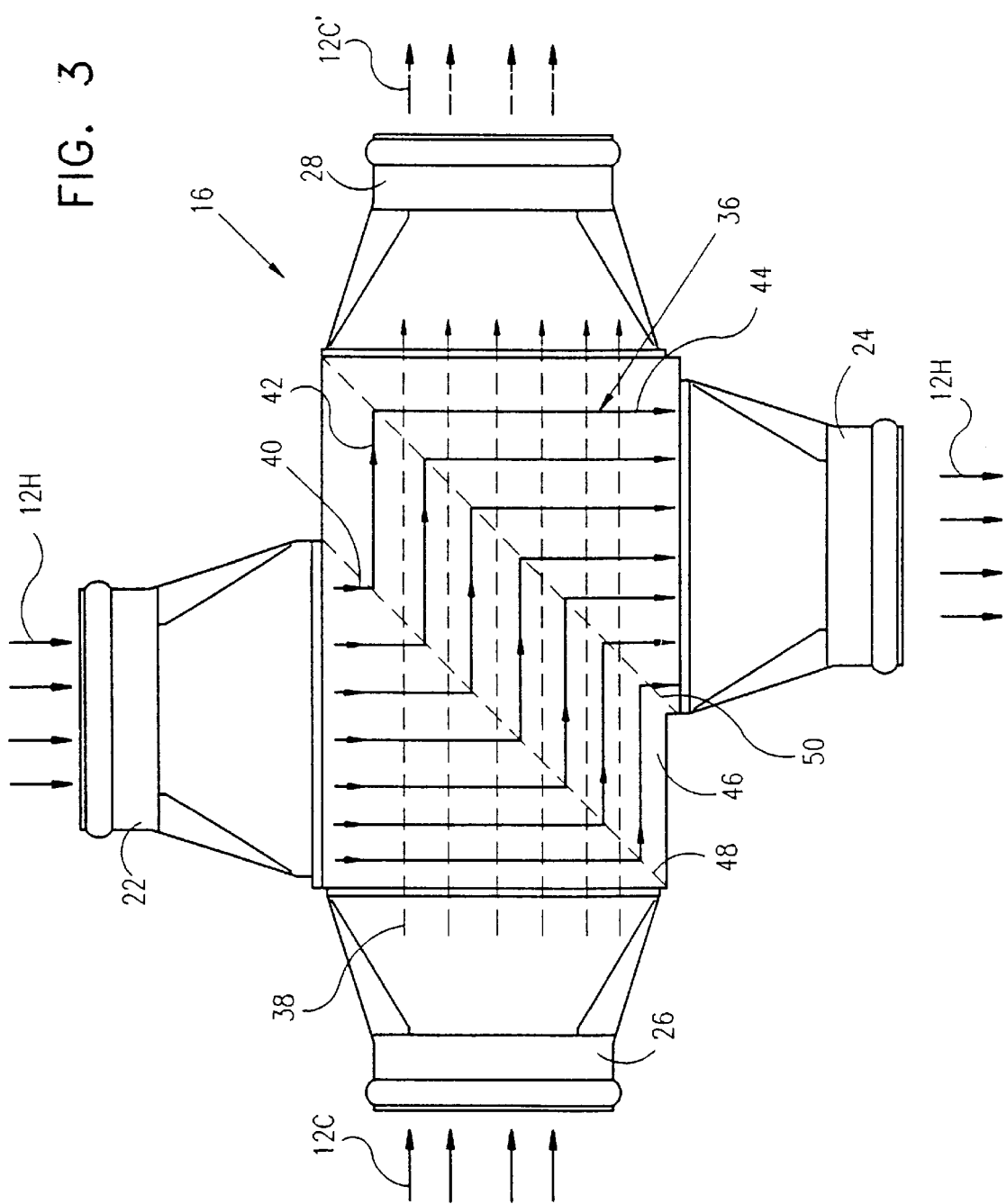
FIG. 3 is a simplified top view illustration of the condenser heat exchanger shown in FIG. 2.

Referring additionally to FIG. 3, it is seen that hot fluid flow path 36 preferably comprises an inlet cross-flow portion 40 generally, although not necessarily, perpendicular to cold fluid flow path 38, a parallel flow portion 42 generally parallel to cold fluid flow path 38, and an exit cross-flow portion 44 generally, although not necessarily, perpendicular to cold fluid flow path 38. Thus in a region 46, generally bounded by dashed lines 48 and 50 in FIG. 3, the relatively hot fluid 12H flows generally parallel to and in a common direction with relatively cold fluid 12C.

A reason for inlet 40 and exit 44 cross-flow portions is that it is somewhat difficult to separate the hot and cold fluids at the inlet and exit of a parallel flow heat exchanger, as is known in the art. In a cross-flow arrangement, it is relatively easy to separate the flows.

Figure 4:
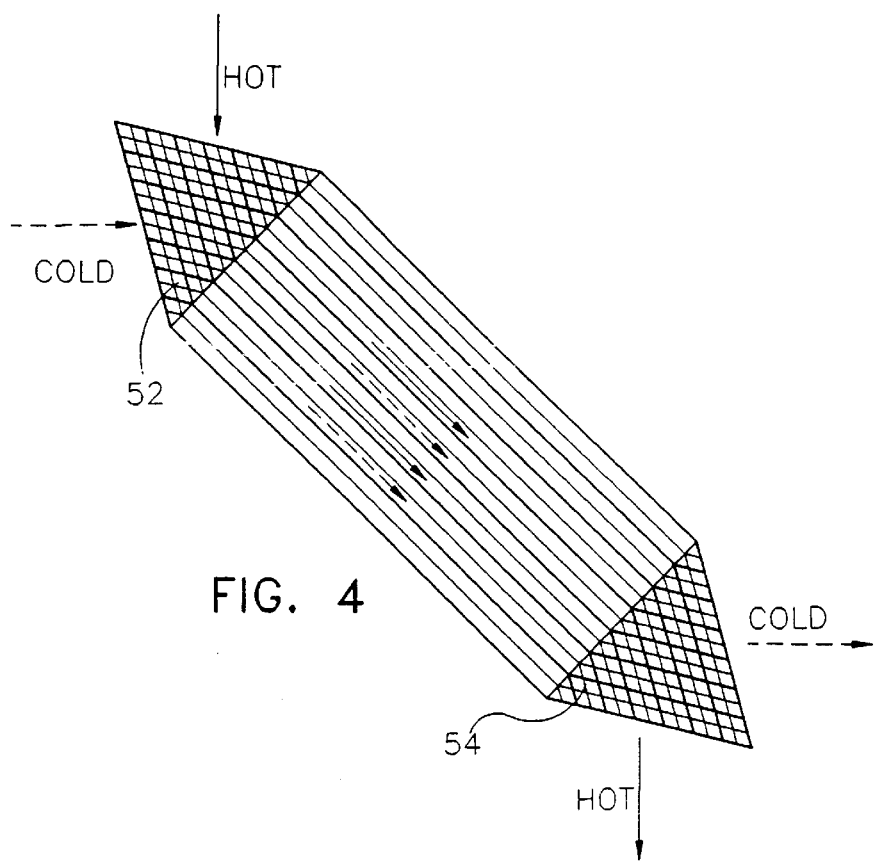
FIGS. 4 and 5 are illustrations of condenser heat exchangers, constructed and operative in accordance with further embodiments of the present invention, and comprising cross-flow inlet and exit portions having different configurations than that of the condenser heat exchanger of FIG. 2.
Figure 5:
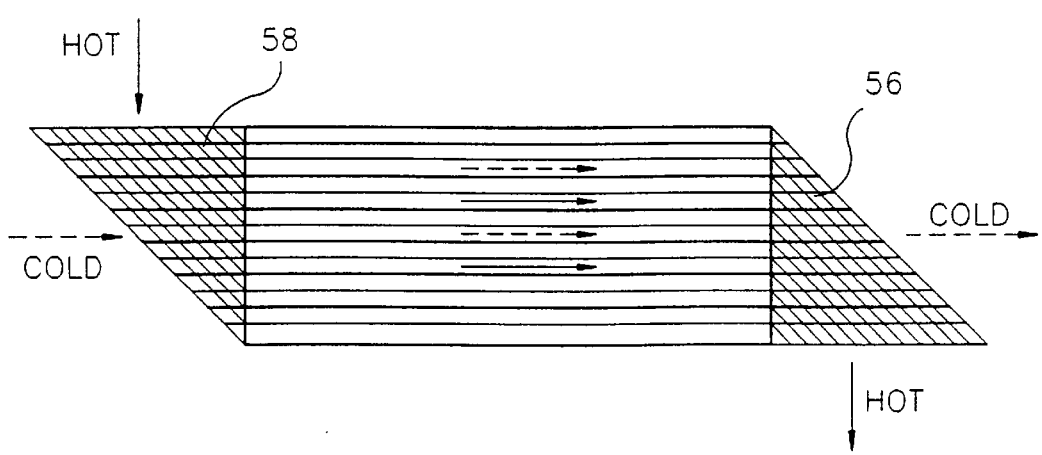

In the embodiment shown in FIG. 3, inlet cross-flow portion 40 is generally perpendicular to cold fluid flow path 38, and exit cross-flow portion 44 is generally perpendicular to cold fluid flow path 38, as mentioned above. FIG. 4 illustrates one example of non-perpendicular inlet and exit cross-flow portions 52 and 54. FIG. 5 illustrates another example of non-perpendicular inlet and exit cross-flow portions 56 and 58. The embodiment of FIG. 3 is considered the best mode, due particularly to its compact design.

Reference is again made to FIGS. 2 and 3. Unlike the prior art, the cold inlet cross-flow portion 40 is not constructed for heat transfer purposes. On the contrary, the density of fins 32C in the cold inlet cross-flow portion 40 is relatively low such that heat transfer thereat between cold fluid 12C and the heat exchanger surfaces associated with fins 32C and parting plate 35 is minimized in order to ensure that the temperature of the cold side surfaces of fins 32C and parting plate 35 does not drop below freezing. Indeed no fins are required in the cold inlet cross-flow portion 40 for heat transfer; rather fins 32C in the portion 40 are present for structural integrity and for smoothing and equalizing the flow of fluid 12C. Typically the fin density is less than 8 fins per inch.

The fin densities in parallel flow region 46, for both fluids 12C and 12H, are relatively high for good heat transfer in a relatively compact volume. Typically the fin density is about 18 fins per inch. The bulk of the heat transfer in the condenser heat exchanger 16 occurs in parallel flow region 46.

Ice formation is prevented by designing fins 32C and 32H such that the thermal resistance to heat transfer from the hot side, i.e. rows 34A, is lower than the thermal resistance to heat transfer from the cold side, i.e. rows 34B.

Specifically, the fin geometry (e.g. height, density, thickness) is designed to satisfy the following condition:

$$R_c/R_h > (-T_c/T_h)$$

where $R_h = 1/(h_h A_h e_h)$ and $$R_c = 1/(h_c A_c e_c)$$

are the thermal resistances between the flow and the heat transfer surface from the hot side and the cold side of the condenser heat exchanger, respectively, and where h=heat transfer coefficient (W/m$^2$C)

A=heat transfer area (m$^2$)

e=heat transfer surface efficiency

T=local flow temperature (C)

The subscripts h and c denote the hot and cold flow sides respectively. The equation holds for the parallel flow region 46, as well as the cross-flow portions 40 and 44.

The cross-flow exit portion 44 serves to separate the flows of hot 12H and cold 12C fluids and to direct them to respective outlets 24 and 28. Exit portion 44 provides only a minor contribution to the total amount of heat transferred.

Figure 6:
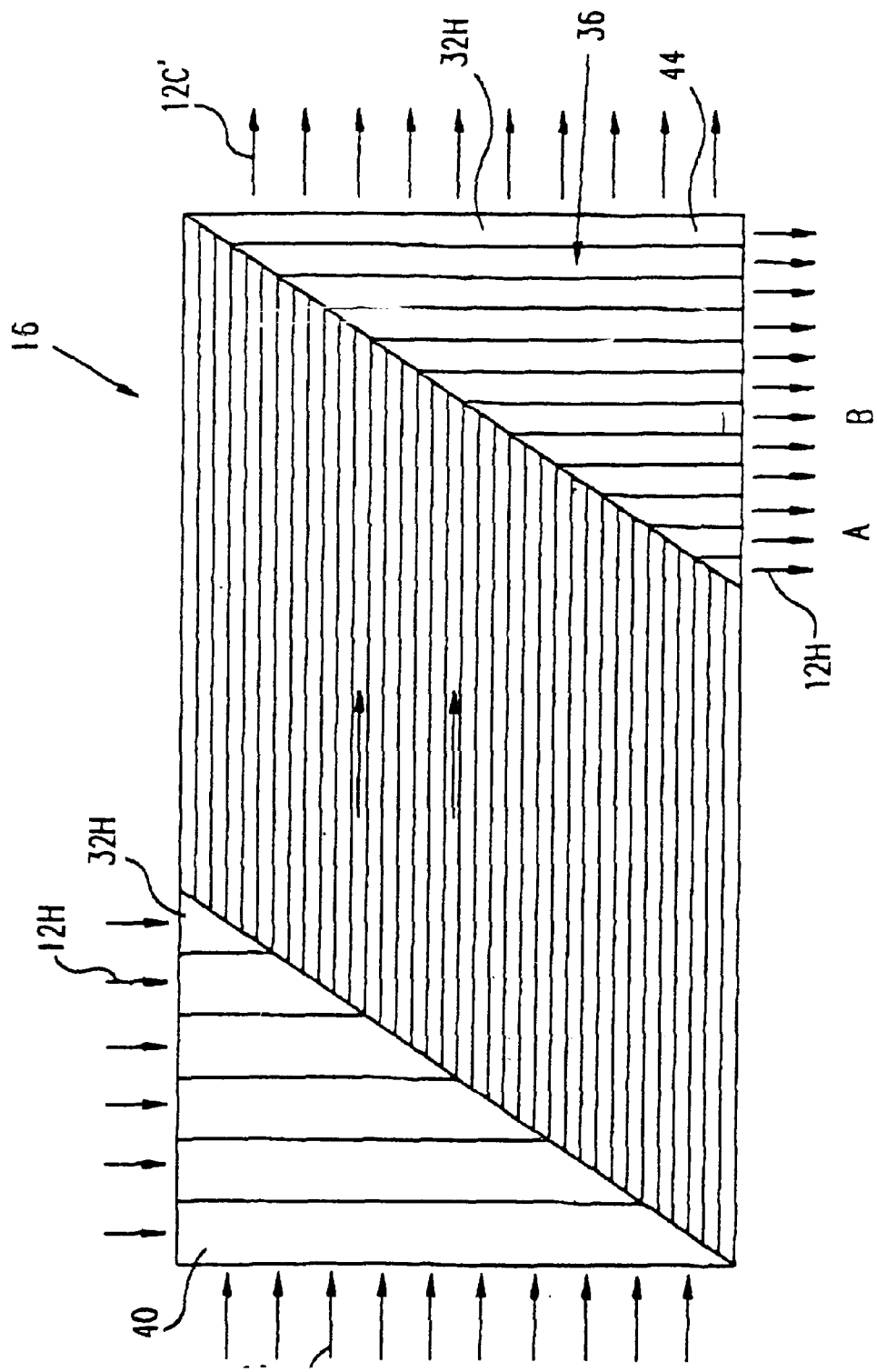
FIG. 6 is a simplified illustration of a condenser heat exchanger, constructed and operative in accordance with a hot fluid flow path having a fin density greater near an outlet end than near an inlet end, so as to direct more flow of hot fluid towards an inlet end of a cold fluid flow path.

Exit portion 44 may be constructed with the same fin densities as inlet portion 40. The anti-icing performance of the present invention may be further enhanced by spacing the fins 32H of the hot fluid flow path 36 closer together in the exit portion 44 than in the inlet portion 40 as illustrated in FIG. 6. This directs more flow of hot fluid 12H to the vicinity of the cold inlet of the condenser 16 where the danger of ice formation is the greatest.

The relatively large temperature difference between the relatively hot fluid 12H and the relatively cold fluid 12C, along with the relatively low thermal resistance between the fins 32H and fluid 12H as compared to the thermal resistance between the fins 32C and fluid 12C, substantially prevents ice formation in condenser heat exchanger 16. Moreover, the temperatures of the flow of relatively hot fluid 12H and the flow of relatively cold fluid 12C gradually approach each other. This means that the temperature difference between the hot and cold flows does not only exist near the cold inlet 26, but rather prevails in region 46 and beyond region 46 towards outlet 28, such that ice formation is substantially prevented throughout the entire condenser heat exchanger 16.

Thus the present invention substantially prevents ice formation in the entire condenser heat exchanger 16 for both paths of flow from the turbine 20 and the reheater heat exchanger 14.

Referring again to FIG. 2, in accordance with a preferred embodiment of the present invention, each of the rows 34A and 34B have closure bars 60 and 62 located near inlets 22 and 26 respectively, and closure bars near outlets 24 and 28. The closure bars near the outlets 24 and 28 are not shown in the view of FIG. 2.

In accordance with a preferred embodiment of the present invention, each of the closure bars 62 near cold inlet 26 have a streamlined shape, such as a tapered end 64. The upstream streamlined shape near inlet 26 tends to minimize the flow stagnation zones on the front of the closure bars 62 and to reduce the effect of inertial capture of snow and ice particles by the closure bars 62, again helping prevent ice formation.

It will be appreciated by persons skilled in the art that the present invention is not limited to what has been particularly shown and described hereinabove. Rather, the scope of the present invention is defined only by the claims that follow:

We claim:

1. A condenser heat exchanger comprising:

a plurality of heat transfer elements defining cold fluid flow paths with inlet and outlet ends for flow therethrough of a relatively cold fluid in a first direction;

a plurality of heat transfer elements defining hot fluid flow paths with inlet and outlet ends for flow therethrough of a relatively hot fluid, each said hot fluid flow path comprising a first portion, called an inlet portion, which flows in a first non-parallel direction with respect to said first direction, a second portion, called a parallel-flow portion, which flows substantially in said first direction parallel to said cold fluid flow paths; and a third portion, called an exit portion, which flows in a second non-parallel direction with respect to said first direction, wherein said inlet portion, said parallel-flow portion, and said exit portion each have a length, wherein the total length of the hot fluid flow path equals the sum of the lengths of said inlet portion, said parallel-flow portion, and said exit portion;

wherein said hot fluid flow paths are arranged side by side from a region near said cold fluid flow path inlet end to a region near said cold fluid flow path outlet end, wherein the total lengths of each of the hot fluid flow paths are generally equal, wherein the lengths of the parallel-flow portions of the hot fluid flow paths are generally equal and the lengths of the inlet portions gradually decrease in said first direction, the length of the inlet portion closest to said cold fluid flow path inlet end being the longest length of the inlet portion, and the lengths of the exit portions gradually increase in said first direction, the length of the exit portion closest to said cold fluid flow path outlet end being the longest length of the exit portion;

and wherein said plurality of heat transfer elements comprise a plurality of finned passageways, and wherein fins in said exit portions are spaced closer together than fins in said inlet portions.

2. A method for preventing ice formation in a condenser heat exchanger, comprising:

providing a plurality of heat transfer elements defining cold fluid flow paths with inlet and outlet ends for flow therethrough of a relatively cold fluid in a first direction;

providing a plurality of heat transfer elements defining hot fluid flow paths with inlet and outlet ends for flow therethrough of a relatively hot fluid, each said hot fluid flow path comprising a first portion, called an inlet portion, which flows in a first non-parallel direction with respect to said first direction, a second portion, called a parallel-flow portion, which flows substantially in said first direction parallel to said cold fluid flow paths; and a third portion, called an exit portion, which flows in a second non-parallel direction with respect to said first direction, wherein said inlet portion, said parallel-flow portion, and said exit portion each have a length, wherein the total length of the hot fluid flow path equals the sum of the lengths of said inlet portion, said parallel-flow portion, and said exit portion;

arranging said hot fluid flow paths side by side from a region near said cold fluid flow path inlet end to a region near said cold fluid flow path outlet end, wherein the total lengths of each of the hot fluid flow paths are generally equal, wherein the lengths of the parallel-flow portions of the hot fluid flow paths are generally equal and the lengths of the inlet portions gradually decrease in said first direction, the length of the inlet portion closest to said cold fluid flow path inlet end being the longest length of the inlet portion, and the lengths of the exit portions gradually increase in said first direction, the length of the exit portion closest to said cold fluid flow path outlet end being, the longest length of the exit portion, and wherein said plurality of heat transfer elements comprise a plurality of finned passageways, and wherein fins in said exit portions are spaced closer together than fins in said inlet portions; and preventing ice formation due to freezing of at least one component of either of said relatively hot fluid and said relatively cold fluid, by maintaining a thermal resistance between said heat transfer elements and said flow of said fluids therethrough, and maintaining a temperature difference between said hot and said cold fluid flow paths over a portion of said heat exchanger.

3. The method according to claim 2 and comprising arranging said plurality of heat transfer elements in a stack of a plurality of alternating rows of said hot fluid flow paths and said cold fluid flow paths.

4. The method according to claim 2 and comprising transferring most of the heat in the condenser heat exchanger in said parallel-flow portion.

5. The method according to claim 2 and comprising constructing fins in a cold inlet cross-flow portion not for heat transfer, but rather only for structural integrity.

6. The method according to claim 2 and comprising constructing fins in a cold inlet cross-flow portion not for heat transfer, but rather only for smoothing the flow of the cold fluid therethrough.

* * * * *